Patented June 6, 1944

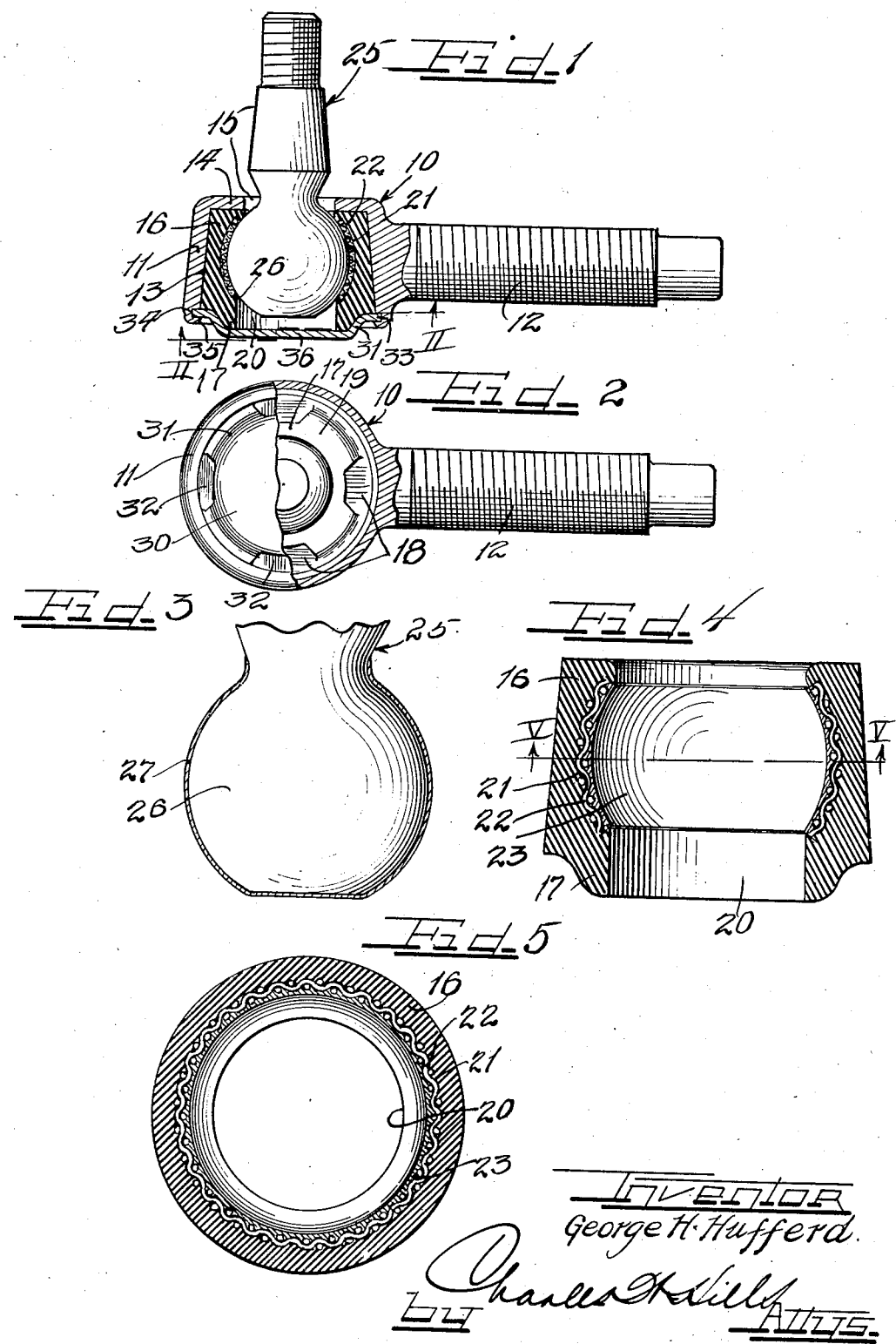

2,350,398

UNITED STATES PATENT OFFICE 2,350,398

JOINT CONSTRUCTION

George H. Hufferd, Detroit, Mich., assignor to Thompson Products Incorporated, Cleveland, Ohio, a corporation of Ohio Application December 6, 1940, Serial No. 368,751

7 Claims. (Cl. 287—85)

This invention relates to joints having relatively movable members in bearing engagement wherein one of the bearing members is a flexible woven fabric coated with a metal forming a glazed or smooth surface on the fabric.

More specifically this invention relates to ball and socket type tie rod joints wherein the socket includes a rubber bushing having a ball receiving chamber lined with woven fabric that has been metal sprayed to form a glazed, smooth surface for bearing engagement with the ball.

Lubricant impregnated fabric liners have been proposed for bearings. However, the lubricants such as grease, graphite, or the like, will rapidly bleed out of the fabric and work away from the bearing surfaces thereby exposing the fabric to direct action against a movable bearing member. As a result friction is materially increased and the fabric will be rapidly worn away.

The present invention now overcomes the deficiencies of fabric-lined bearings by spraying a molten metal onto the fabric for forming a smooth or glazed metal surface thereon. This metal surface will not bleed out of the fabric or work away from the bearing surfaces and the invention now makes possible the use of flexible fabric liners in place of rigid metal bearings.

It is, then, an object of the invention to provide fabric-lined bearings with metal bearing surfaces built up on the fabric liner.

A specific object of this invention is to provide tie rod joints having metal stud members in bearing engagement with a metal surface built up on a flexible fabric liner in a resilient rubber bushing.

Another specific object of this invention is to provide resilient tie rod joint constructions including resiliently backed flexible liners presenting metal bearing surfaces.

A further object of this invention is to provide metal coatings on the bearing surfaces of tie rod joint studs which are especially adapted for free bearing cooperation with sprayed metal coatings on flexible fabric liners.

A very specific object of the invention is to provide a tie rod joint construction including a cadmium plated stud in bearing engagement with a glazed copper surface on a flexible fabric liner which is carried by a rubber bushing in the joint housing.

Other and further objects of the invention will be apparent to those skilled in the art from the following detailed description of the annexed sheet of drawings which, by way of example, illustrate a preferred embodiment of the invention.

On the drawing:

Figure 1 is a side elevational view, with parts broken away and shown in vertical cross section, of a ball and socket tie rod joint according to this invention.

Figure 2 is a bottom plan view of the joint shown in Figure 1 with parts broken away and shown in horizontal cross section along the line II—II of Figure 1.

Figure 3 is an enlarged fragmentary view of the ball end of the stud shown in Figure 1, and illustrating the metal coating on the ball end in vertical cross section.

Figure 4 is an enlarged vertical cross-sectional view taken through the metal-coated fabric-lined rubber bushing of the joint shown in Figure 1.

Figure 5 is a horizontal cross-sectional view taken along the line V—V of Figure 4.

As shown on the drawing:

In Figures 1 and 2 the reference numeral 10 designates generally a tie rod joint of the ball and socket type. The joint 10 includes a cylindrical housing 11 having a laterally extending threaded shank portion 12 for threaded insertion in the end of a tie rod (not shown).

The housing 10 has a frusto-conical bore 13 therein normal to the shank 12 with the large end of the bore at the bottom of the housing and with the small end of the bore bottomed by an inturned annular flange 14 defining a restricted circular opening 15 to the housing.

A frusto-conical rubber bushing 16 is mounted in the bore 13 in snug engagement therewith and against the flange 14. The bushing 16 has a dependent circular rim portion 17 extending beneath the bottom of the housing 11 and peripherally recessed as at 18 (Figure 2) at spaced intervals therearound to define a plurality of localized lugs 19.

The bushing has a cylindrical bore 20 through the center thereof. The bore 20 is normal to the shank 12 of the housing.

An intermediate portion of the bore 20, in alignment with the shank 12 of the housing as shown in Figure 1, is provided with a segmental spherical recess 21. The recess 21 has a flexible fabric liner 22 such as canvas, vulcanized therein. The woven fabric 22 thus forms an integral part of the bushing.

In accordance with this invention, and as best shown in Figures 4 and 5, the exposed face of the fabric liner 22 is sprayed with a somewhat ductile metal to provide a metal bearing surface 23 on the liner. This metal bearing surface may be relatively thin and deformable with the fabric which is resiliently backed by the rubber bushing.

Examples of suitable metals for spray coating the fabric are copper, lead, bronze, and, in some instances, tin. These metals are ductile, have good bearing qualities, and will not work out of the fabric and away from the bearing surface.

A ball stud 25 has the ball end 26 thereof seated in the bushing 16 in bearing engagement with the metal coating 23 on the fabric liner. In accordance with this invention, and as shown in Figure 3, the ball end 26 can be composed of any suitable metal but is preferably coated with a bearing metal having good bearing cooperation with the metal sprayed on the fabric liner. A coating 27 of metals such as cadmium, or chromium, is highly satisfactory.

The open bottom of the housing 11 is closed by means of a cap 30 (Figures 1 and 2) which engages the bottom of the bushing and which has sloping shoulders 31 engaging the outer periphery of the rim 17. These shoulders 31 are locally depressed as at 32 (Figure 2) into the recesses 18. The depressed portions abut the lugs 19 of the rim 17.

As shown in Figure 1 the cap 30 has a flat peripheral rim portion 33 seated in a groove 34 around the bore 13 of the housing. The end of the housing is then peened or spun as at 35 over the rim 33 to retain the cap in fixed engagement in the groove.

Since the lugs 19 on the rim 17 of the bushing are abutted by the localized depressed portions 32 of the cap, the bushing cannot rotate relative to the cap. Since the cap is tightly spun into the groove 34, the cap cannot rotate relative to the housing.

The stud 25 thus has the ball end 26 thereof disposed in the housing and, since this ball end has a larger diameter than the opening 15, the stud cannot be removed from the housing without removal of the cap 30.

The stud 25 can rotate about its own axis and tilt relative to the housing while the coating 27 on the ball end thereof is in bearing engagement with the metal coating 23 on the fabric. Since the rubber bushing is resilient, a shock absorbing mounting is provided for the stud and the metal coating will readily adapt itself, by virtue of the resilient backing for the fabric, into proper bearing engagement with the coating on the ball end. The coating need not initially have a true segmental spherical form since the ball end is preferably pressed into the bushing and interparticle flow of the rubber will then move the metal coating into the proper bearing engagement with the ball end.

The metal coating can readily be applied with the known types of molten metal spray guns. Relatively ductile metals are used to form the coating and these metals should have melting points which are relatively high but not high enough to burn the fabric when the molten spray is deposited on the fabric.

Tests have been made with the following combinations of coatings on the stud and on the liner:

|     | Stud coating | Liner coating |
| --- | --- | --- |
| (1) | Cadmium | Copper. |
| (2) | Chromium | Lead. |
| (3) | Cadmium | Do. |
| (4) | ---do--- | Bronze. |
| (5) | Chromium | Tin. |

The longest wear life was obtained with a cadmium-plated stud in bearing engagement with a copper-coated fabric liner. The tests were conducted under test conditions which simulate conditions to which tie rod joints are subjected under severe load, shock, and weather influences. One of the tests to which the joints of this invention was subjected included operation of the joints under load in a water spray. Under these conditions graphite will quickly be washed out of the fabric and out of the joints. However, the metal coatings on the fabric now provided by this invention were not washed out like the graphite.

While the invention has been described as embodied in a ball and socket type tie rod end, it should be understood that it is applicable to all types of joint constructions including relatively movable members in bearing engagement with one of the bearing surfaces being a flexible fabric or woven material coated with metal to provide a smooth glazed bearing surface.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A ball and socket joint comprising a housing, a rubber bushing in said housing defining a ball socket, a stud member having a ball end in said socket, a ductile metal-impregnated flexible fabric liner in said socket secured to said bushing and presenting a smooth glazed metal bearing surface in engagement with said ball end, and said ball end of the stud being larger than the lined ball socket of the bushing whereby the bushing is loaded to constantly urge the ductile metal bearing surface into full bearing engagement with the ball end.

2. A resilient ball and socket tie rod joint which comprises a housing having a laterally extending shank and a tapered bore therethrough normal to said shank, said tapered bore having a countersunk portion at the large end thereof providing an annular shoulder in the housing, a rubber bushing disposed in said bore of the housing and having a bore therethrough with an intermediate segmental spherical recessed portion, a metal-impregnated flexible fabric liner secured in said segmental spherical recessed portion of the bushing, a ball stud projecting from said housing and having the ball end thereof in bearing engagement with the metal-impregnated fabric liner, a cap member seated in said countersunk portion against said shoulder for closing said housing, said housing having a portion turned over said cap member to lock the member in the housing, and said member having locally depressed portions engaging said bushing to lock the bushing against rotation.

3. A resilient tie rod joint which comprises a housing defining a socket chamber and having an externally threaded laterally extending shank adapted for insertion in the end of a tie rod, a rubber bushing disposed in said socket chamber of the housing and having a bore therethrough with an intermediate enlarged portion, a flexible fabric liner secured in the intermediate enlarged portion of the bore, a sprayed ductile metal coating on said liner presenting a smooth glazed bearing surface, a stud projecting from said housing and having a bearing portion seated on the glazed smooth surface of the metal coated liner, and a closure member secured to said housing having locally depressed portions engaging said rubber bushing to lock the bushing against rotation in the socket chamber.

4. A joint construction comprising a housing defining an open ended chamber with a large opening at one end and a smaller opening at the other end thereof, a one piece resilient bushing in said chamber having a fabric-lined recess communicating with the smaller opening, said recess being larger than said smaller opening, a stud having a shank projecting through said smaller opening and a head seated in said recess, said head being larger than said smaller opening, a ductile metal coating on said fabric presenting a smooth glazed metal bearing surface in bearing engagement with said head of the stud, said one-piece metal coated fabric-lined bushing being resiliently deformable to receive said stud head therein, and a closure member secured in the large opening engaging said bushing whereby the resilient bushing material will urge the metal bearing surface into constant bearing engagement with the head of the stud and the stud head cannot be removed through the smaller opening.

5. A ball and socket joint comprising a housing, a hollow one-piece resilient bushing in said housing, a deformable bearing material liner in said bushing bonded to the bushing and providing a segmental spherical socket in the bushing, a stud having a ball end seated in said socket in bearing engagement with said liner, said bushing being deformable to receive the ball end of the stud therein, and means retaining the bushing in the housing.

6. A joint construction comprising a stud member having a head portion plated with a metal of the group consisting of cadmium and chromium, a one-piece hollow rubber bushing having a fabric-lined cavity receiving said stud head in tiltable and rotatable relation, said fabric lining being impregnated with a metal selected from the group consisting of copper, lead, bronze and tin, and presenting a smooth glazed bearing surface in engagement with the stud head, and a housing receiving said bushing and head of the stud to confine the rubber for urging the metal-impregnated fabric liner into bearing engagement with the head of the stud.

7. A ball and socket joint comprising a housing having a small opening in one end thereof and a larger opening in the other end thereof, a hollow open-ended one-piece rubber bushing in said housing, said bushing having a segmental spherical cavity between the open ends thereof, and said open ends of the bushing being aligned with the openings in the housing, a deformable bearing material liner in said cavity vulcanized to the bushing, a ball stud having a shank extending through the small opening of the housing and a ball end seated in said liner, said ball end being of larger diameter than the small opening in the housing and of larger size than the openings in the ends of the bushing, said one-piece bushing and liner being resiliently deformable to receive said ball end in the cavity therein, and a closure member secured in the large opening of the housing engaging said bushing to retain the assembly in the housing whereby the bushing will urge the liner into constant bearing engagement with the ball end and said stud can tilt and rotate on the bearing surface provided by the liner.

GEORGE H. HUFFERD.